US012710935B1

(12) United States Patent
Foley et al.

(10) Patent No.: US 12,710,935 B1
(45) Date of Patent: Aug. 18, 2026

(54) SYSTEM AND METHOD OF MAINTAINING CONTEXTUAL RELATIONSHIPS AND OPERATIONAL COMPATABILITY IN CODEBASE FUNCTIONALITY EMPLOYED ACROSS MULTIPLE PLATFORMS

(71) Applicant: ZILO Technology Limited, London (GB)

(72) Inventors: Huw Vaughan Foley, Alderney (GB); Sergio Alvares, Basingstoke (GB)

(73) Assignee: ZILO Technology Limited, London (GB)

( * ) Notice: Subject to any disclaimer, the term of this patent is extended or adjusted under 35 U.S.C. 154(b) by 0 days.

(21) Appl. No.: 19/259,341

(22) Filed: Jul. 3, 2025

(30) Foreign Application Priority Data

May 9, 2025 (GB) ..................................... 2507202

(51) Int. Cl.
*G06F 8/35* (2018.01)
*G06N 3/042* (2023.01)
*G06N 3/092* (2023.01)

(52) U.S. Cl.
CPC ............... *G06F 8/35* (2013.01); *G06N 3/042* (2023.01); *G06N 3/092* (2023.01)

(58) Field of Classification Search
CPC ........... G06F 8/35; G06N 3/042; G06N 3/092
(Continued)

(56) References Cited

U.S. PATENT DOCUMENTS 1,579,874 A * 4/1926 Locke ................. A47J 37/1204 99/403
8,200,743 B2 * 6/2012 Lee ..................... H04L 41/0695 709/224

(Continued)

OTHER PUBLICATIONS

Chang et al, "Intelligent Agent Planning for Optimizing Parallel MRI Reconstruction via A Large Language Model", IEEE, pp. 1-4 (Year: 2024).*

(Continued)

*Primary Examiner* — Anil Khatri
(74) *Attorney, Agent, or Firm* — Workman Nydegger

(57) ABSTRACT

The inventive system of FIG. 1 and its underlying functionality make use of AI agents to support adaptation of data processing functions across different but inter-related operating platforms to maintain inter-operability of functions. AI agents determine, using a multi-dimensional knowledge graph and dependent sub-graphs, contextual relationships for information chunks associated with nodes and edges and classify these contextual relationships by weighting inferred for each mode by related sub-graphs. AI-agent interrogation of the sub-graphs identifies the extent and impact by which coding evolution in one platform adversely affects existing operational functionality in the different operating platform (s), or in an application in a data migration use case. The use of object-orientated codebases provides for self-learning within the resultant multi-dimensional knowledge graph, thereby permitting inquisitorial assessment of impact as well as appropriate code generation under control of system intelligence and, particularly, an AI-agent swarm. Code (Continued)

generation is independent of any front end LLM, with the generated code propagated automatically through the system to preserve inter-operability of functions instantiated in the inter-related operating platforms.

30 Claims, 4 Drawing Sheets

(58) Field of Classification Search
USPC ............................... 717/106–120; 706/25–45
See application file for complete search history.

(56) References Cited

U.S. PATENT DOCUMENTS

| | | | | |
|---|---|---|---|---|
| 8,789,011 | B2 * | 7/2014 | Miller | G06F 16/24564<br>717/109 |
| 9,069,560 | B2 * | 6/2015 | Jalaldeen | G06F 8/35 |
| 9,483,238 | B2 * | 11/2016 | Duggal | G06F 8/10 |
| 9,577,911 | B1 * | 2/2017 | Castleman | H04L 67/10 |
| 11,625,227 | B2 * | 4/2023 | Kaitha | G06F 8/35<br>717/106 |
| 11,748,634 | B1 * | 9/2023 | Kulkarni | G06F 18/21<br>707/722 |
| 11,875,240 | B1 * | 1/2024 | Bosnjakovic | G06F 40/40 |
| 12,159,313 | B1 * | 12/2024 | Kumar | G06Q 40/06 |
| 12,165,079 | B2 * | 12/2024 | Kang | G06N 5/04 |
| 12,293,272 | B1 * | 5/2025 | Poulis | G06N 3/042 |
| 12,321,725 | B1 * | 6/2025 | Wilson | G06F 8/36 |
| 12,406,242 | B2 * | 9/2025 | Cella | G06Q 10/06311 |
| 12,602,549 | B1 * | 4/2026 | Galvin | G06F 40/30 |
| 2018/0076968 | A1 * | 3/2018 | Rosenberg | G06N 20/00 |
| 2024/0121125 | A1 * | 4/2024 | Blair | G06F 40/263 |

OTHER PUBLICATIONS

Zhang et al, “Towards Robust Knowledge Graph Embedding via Multi-Task Reinforcement Learning”, IEEE, pp. 1-14 (Year: 2023).*

Rajendran et al, “Advancing Agentic AI: Synthetic Data for Personified and Inclusive Human-AI Interactions”, ACM, pp. 1-7 (Year: 2025).*

Jiahao et al, “Learning to Swarm with Knowledge-Based Neural Ordinary Differential Equations”, IEEE, pp. 1-7 (Year: 2022).*

Combined Search Report and Abbreviated Examination Report for GB Application No. 2507202.6 dated Jan. 22, 2026.

* cited by examiner

SYSTEM AND METHOD OF MAINTAINING CONTEXTUAL RELATIONSHIPS AND OPERATIONAL COMPATABILITY IN CODEBASE FUNCTIONALITY EMPLOYED ACROSS MULTIPLE PLATFORMS

CROSS REFERENCE TO RELATED APPLICATION

The present application claims priority to and the benefit of United Kingdom Patent Application 2507202.6, filed on May 9, 2025, the entire contents of which are hereby incorporated by reference.

FIELD OF THE INVENTION

This invention relates, in general, to a system and method of maintaining contextual relationships in codebase functionality and is especially, but not exclusively, applicable to Artificial Intelligence "AI" based technologies, particularly (but not exclusively) exemplified in the context of a transfer agency environment and the use of knowledge graphs. The present invention, more particularly, relates to the provision of structural constraints within an augmented knowledge graph to identify core contextual characteristics relating to interoperability and continuing interoperability across disparate processing platforms of code relating to functional chunk.

SUMMARY OF THE PRIOR ART

Historically, migrating large-scale transfer agency "TA" data has been fraught with complexity, risk, and significant costs. Transfer agency operation is tasked to consume data in one format and to migrate that data into a different format manipulated in a different coding. To appreciate the one significant problem, organizations often deal with legacy data and long-standing books of business that contain 15-20 years of transactional data, much of which has already undergone previous system migrations. These data sets may also have been affected by regulatory and functional changes over time, leading to redundancy, inconsistencies, and data integrity issues. As a result, organizations face the challenge of analysing, cleansing, and migrating vast amounts of data that is costly and time consuming.

Making a functional change in one platform environment, implemented with new or adapted code modules, typically has functional repercussions for another operational platform. Problems arise, particularly and invariably, because of a failure to appreciate the interactional complexities between seemingly independent platforms. Making a perceived improvement to address a deficiency—or just an evolutionary upgrade in functionality of coding related to a chunk—in a first platform can, in fact, destroy contextual and/or interoperability relationships related to processing of data in a different environment/platform. In short, adaptation or substitution of code related to a functional chunk in one platform has likely operational repercussion and, in this respect, can cause operational breakdown in another software platform, e.g., through (i) a failing of functional operation, and/or (ii) a degradation in overall network-wide performance involving an affected complementary or other secondary inter-dependent platform(s), and/or (iii) loss of or inaccessibility to data that results in compromised processing errors, compounded errors in later generational software releases, and/or (iv) spurious results that may not be immediately evident.

The issues with maintaining inter platform inter-operability arising from software updates on one platform (which impact on functionality in another related but disparate platform) are broader that just within the exemplified contexts of TA, with it true to say that these issues pertain to many different complex source & target data models and entity relationships therein.

Consequently, effective system management requires recursive retrieval across "chunks," particular in instances where the question is spread across many different repositories or files.

Existing large language models "LLM" can provide some support for task queries provided into the LLM for evaluation and content output. However, current LLMs are limited in their forward awareness and, moreover, can generate inaccurate or ineffectual content tarnished by hallucinatory context.

In addressing migration and coding within platforms that may make use of artificial intelligence "AI" techniques, existing organizational structures for realising both of these technical processes are based on a descending human authority structure. At the highest level, an agent (e.g., the Chief Technology Officer, CTO) assigns tasks to specific team leaders for, say, JAVA® code production or user interface development. Subject-Matter Experts (SMEs), subordinate to the team leaders, will be assigned to complete specific tasks, with this including a determination of whether the LLM—and its output—is insufficient for purpose. The hierarchy and knowledge base both contribute to extending the time for system development, particularly in the exemplary context of data migration.

AI-assisted coded solutions presently rely of similarity searching of text to locate, within a codebase, a piece of code that has a description that aligns with a user-specified search parameter. The code is returned and, if appropriate, modified in a somewhat trivial fashion to account for a specific future use case. This results in a local solution that compromises functional operational effectiveness external to the local platform. The AI system, in identifying and making use of returned code, simply modifies the code module that it finds without taking into account wider implications arising from any change to the structure of that code module or its function.

TA migration projects thus demand SMEs endowed with deep technical knowledge of both the source and target systems. The specific knowledge may, in fact, need to be developed from a more general appreciation of system operation and the problems faced, for example, in data migration. From the outset, finding such specialists with specific knowledge can therefore be taxing if not impossible. Indeed and consequently, such projects often require a team of five to six full-time experts working for 9-12 months, with the team developing a complete appreciation over this period. Moreover, due to the high demand for limited resources having the expertise, many organizations have little choice but to opt for external consultants. This solution is not only expensive but also results in a loss of knowledge at the end of the project.

In the context of an AI-supported implementation, transfer learning techniques, exploiting AI agents in a deep learning environment, can make use of a model trained on one task as a starting point for training a model on a related task. This allows for faster and more efficient training and more efficient (in terms of faster and more cost-effective) generation of code/software, particularly when the new task has limited data or is similar to the original task. By leveraging the knowledge already learned, transfer learning reduces the need to train a model from scratch, saving time and computational resources. The agent, in this context, thus understands aspects of the underlying nature of the data with which it is presented. AI agents, in such arrangements, effectively sit between the human team and the trained AI function, and those agents must consequently be configured to maintain operational accuracy usually delivered/overseen at human levels. However, existing AI system are limited by their perceptive abilities and how they are trained.

There is one last concept that should be considered in the context of the use of AI-agents in a supportive AI environment, namely the use of a knowledge graph "KG". A KG creates generalised relationships between concepts by organising and integrating data according to an ontology. Unfortunately, articulating or generating the right ontology for the right context is problematic because, in the context of LLMs, the ontology that can be created may vary wildly because people express things differently and inconsistently. Even within the same codebase, different questions will have different ontologies; this is a problem.

The ontology is essentially the schema of the knowledge graph, i.e., the concepts and the relationships to be tracked within the graph. In a code repository graph, concepts like "service", "function", "dependency", and relationships like "import(s)", "call(s)", "implements" are all part of the ontology that is hopefully useful for the specific context the creator of the ontology had in mind, but different expressions can lead to different interpretations.

KGs consists of "nodes" which represent entities or concepts, and "edges" which represent the general connection between those functions. In this respect, each node will therefore contain a "chunk," i.e., a meaningful set of related information/data collated together usually derived from some form of a web-accessible tool. Chunking therefore involves segmenting large volumes of complex information into smaller, more manageable units generally composed of familiar or meaningful sets of information that are recalled together. This strategy improves information processing, comprehension, and retrieval, especially (but not exclusively) in a business environment having large datasets.

Knowledge graphs can be created from scratch, e.g., by domain experts, learned from unstructured or semi-structured data sources, or assembled from existing knowledge graphs, typically aided by various semi-automatic or automated data validation mechanisms.

Working with a LLM and to process ontology into contextually relevant working data fields in an AI, e.g., a machine learning system, one conventionally and necessarily makes use of tokens and tokenization. A token is the fundamental unit of text, symbols, images or other functional constructs that acts as a building block for process modelling. The AI models uses tokens [representing the applied ontology] to understand and generate a standardized processible instruction by breaking down large pieces of text into smaller, more manageable units. AI models then process tokens to learn the relationships between tokens and to unlock capabilities including prediction, generation and reasoning. In such models, AI tokens thus serve as inputs for algorithms to analyse and learn patterns. In advanced AI models like transformers, AI tokens play an even more critical role. Transformers, for example, process tokens collectively, enabling AI agents to understand context and nuances in language or data structures. This understanding is critical for tasks like translation, sentiment analysis, and content generation.

Tokens are thus fundamental to how AI models interpret input, predict output, and maintain context within a fixed context window. In use, there is an embedding in which each token is converted into a numerical vector that the model can process. Using transformer-based architectures, the model predicts the next AI token based on probability distributions. This is essentially a description of the way in which natural language processing "NLP" is structured.

There is one final piece of implementing AI technology to consider for code generation in existing AI systems using machine learning and NLP, namely AI code generation leveraging "GIT" [a free open-source software code repository storing standard protocols] and related GIT applications. GIT, however, loses contextual relationship (and specifically does not store such contextual relationships), thereby leading to the aforementioned breakdown of platforms that contain inter-related code. GIT supports the automatic creation of code from user prompts. GIT also realises a version control system in a distributed network. GIT offers autocomplete predictions for boilerplate and repetitive coding patterns. These code suggestions save time and effort since developers are not tasked with searching the internet for basic information. AI-based code generation uses algorithms that are trained on existing source code.

SUMMARY OF THE INVENTION

According to a first aspect of the invention there is provided a software development system including: a plurality of trained AI-agents each having assigned functional tasks, said AI agents together forming an agent swarm; a task manager configured to oversee interactions within the agent swarm; a knowledge graph database responsive to the AI agents, the knowledge graph database containing an updateable multi-dimensional knowledge graph in which each node contains a data chunk and wherein each node and at least some edges between nodes are classified by at least one dependent cascaded sub-graph having an assigned attribute for a weighted significance of the data chunk, determined by the agent swarm, with respect to an identified operational impact of the data chunk in a plurality of code modules executed within at least one operational processing platform, wherein each assigned attribute is: generated by the agent swarm by having AI agents interact to apply multi-hop reasoning that reflects a determination of how a first data chunk instantiated in a codebase has previously affected functionality associated with use of the first data chunk; and updateable, as determined by the agent swarm, with time; and processing intelligence, responsive to the multi-dimensional knowledge graph and associated with the agent swarm, wherein the processing intelligence is configured to manage a code writing function configured to take into account, in the generation of code, the assigned attributes for nodes or edges stored within cascaded sub-graphs of the multi-dimensional knowledge graph.

The code writing function can be independent of any front-end large language model "LLM," and the system intelligence may be arranged automatically to propagate generated code, to inter-operationally related operating platforms, that preserves inter-operability of functions instantiated in those inter-related operating platforms.

The agent swarm, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform;

The system intelligence is arranged to, one of: (i) mitigate the effects of instantiated or generated code, making direct use of data chunks or based on evolution of the data chunks, determined by the agent swarm and historically recorded by the system intelligence to have caused adversely compromised processing of data or data integrity within an operational processing platform accessible to the processing intelligence; and (ii) prevent generation of code making direct use of data chunks determined by the agent swarm historically recorded by the system intelligence to have caused functional disruption within an operational processing platform accessible to the processing intelligence, The system intelligence may be arranged to feed back any mitigation strategy into the agent swarm to cause update of the multi-dimensional knowledge graph, thereby to enhance its history and support predictive capabilities of the AI agents.

The attributes preferably provide contextual relationships.

The system preferably uses object-orientated codebases to support self-learning within the multi-dimensional knowledge graph, and the system further includes: a user interface arranged to input a query and to receive a response thereto. The response may be sent as a message over a network.

A weight, w, is determined by the agent swarm and assigned, by the agent swarm, to an attribute in a sub-graph for each node according to a function $$w(\text{node})=\alpha N\_\text{dep}+\beta\Sigma\text{edge\_crit}+\gamma\text{change\_freq}$$

where: w(node) for a sub-graph for a specific node; N_dep is the number of direct dependencies, edge_crit is a criticality score learned from post-mortem incident data reporting efficacy and positive/negative effects of the change at the node or change in the chunk, change_freq captures how often a chunk has been changed, and $\alpha$, $\beta$ and $\gamma$ are integers.

In another aspect of the invention there is provided a data migration system comprising: the software development system of the first aspect and, particularly, claims 1 to 9; a user interface arranged to allow oversight of the software development system; and wherein the system is arranged to create a model based on a transformer architecture trained on a corpus of regular text to predict the relationship between source and target data on at least one of a field-to-field mapping and value mapping within fields.

In another aspect of the invention there is provided a method of developing software code for operation in an operational software platform, the method comprising: instantiating a similarity search by traversing a multi-dimensional knowledge graph containing cascaded dependent sub-graphs in which each node at a highest level of the multi-dimensional knowledge graph contains a data chunk and wherein at least each node is classified by at least one cascaded sub-graph depending from the node and present within a lower contextual level of the multi-dimensional knowledge graph; and assigning, to sub-graphs, attributes for contextually weighted significance of a respective data chunk, determined by interacting AI agents arranged in an agent swarm and wherein each AI agent each has an assigned functional task, with respect to an identified operational impact of the respective data chunk in a code module executed within an operational software platform.

In an embodiment, the method includes using a task manager to oversee and manage process interactions between AI agents in the agent swarm; and applying multi-hop reasoning within the AI swarm to determine how data chunks, instantiated in a codebase, have previously affected functionality in at least one software platform.

The method may further include updating the sub-graphs to reflect predicted or actual changes in operational functionality, determined by the agent swarm, in response to modification of a first data chunk of a node and instantiation of the first chunk in a plurality of code modules in a plurality of inter-related platforms.

In another embodiment, the method further comprises: executing a code writing function, using the agent swarm, that takes into account, in the generation of code, the assigned attributes associated with nodes or edges stored within cascaded sub-graphs of the multi-dimensional knowledge graph.

In an embodiment the code writing function is independent of any front-end large language model "LLM."

In a preferred method, the generated code preserves inter-operability of functions to be instantiated into inter-related operating software platforms.

The agent swarm, in applying multi-hop reasoning, determines how data chunks have previously affected similar functional tasks, instantiated in a plurality of operational software platforms.

The method may further comprise at least one of: mitigating, in response to assessment by system intelligence of historically monitored effects related to use of a first data chunk in a code module, adverse functional effects arising from use in code generated using the first data chunk, wherein mitigating is one of: (i) suppression of the use of the first data chunk in altered coding; and (ii) generation and communication of a warning of how the data chuck could affect functionality of at least one code module in at least one inter-related operating platform.

The method may further comprises feeding back any mitigation strategy into the agent swarm to update the multi-dimensional knowledge graph, thereby enhancing its history and supporting predictive capabilities of the AI agents.

In a preferred method, the agent swarm may determine a weight, w, to be assigned a sub-graph for each node, and the weight is determined according to a function $$w(\text{node})=\alpha N\_\text{dep}+\beta\Sigma\text{edge\_crit}+\gamma\text{change\_freq}$$

where: w(node) for a sub-graph for a specific node; N_dep is the number of direct dependencies; edge_crit is a criticality score learned from post-mortem incident data reporting efficacy and positive/negative effects of the change at the node or change in the chunk; change_freq captures how often a chunk has been changed; and $\alpha$, $\beta$ and $\gamma$ are integers.

The inventive system and its underlying functionality make use of AI agents that support a mapping that embodies and understands the nature of data within the context of different but inter-related operating platforms. The AI agent determines where a change within a code repository has implications and operational impact across multiple platforms and, therefore, identifies the need for multi-platform adaptation of code, i.e., the system supports a contextual orchestration function. The effect is to generate a smart system, based on a cascade to subordinate layers (or "sub-graphs") within a knowledge graph, that can be interrogated by the AI agent to identify tighter contextual relationship.

According to the present invention, the use of object-orientated codebases provides for self-learning within knowledge graphs arranged and structured to permit generated inquisitorial questions to be asked and ultimately resolved by an AI agent. Upon interpreting the KG and lower-level sub-graphs of the invention, the AI agent is configured to work out, independently of any front end LLM, the precise nature and extent of required code changes. A structure within a multi-dimensional cascaded KG sees sub-graphs dependently hung from principal KG nodes containing chunks. Upon an AI agent investigating and interpreting the meaning and reach of data in the lower levels of this cascaded structure, the impact of change on a target system relative to a source is elucidated to the AI agent and actioned/output. According to the invention, sub-graphs that depend form nodes and edges in the KG are weighted in importance to reflect the number of relationships feeding into the higher-level KG node or edge, with a recorded weighting reflecting an extent of impact that a change at the node brings across inter-related platforms.

The lower-level nodes (or "sub KGs", or "mini KGs" or other similar expression conveying retention of contextual impact data stored within a subordinate cascaded level(s) of a KG) thus are configured to support increasing detail within entities, e.g., platforms and preferably operational components within platforms listed within a database, that are affected by proposed or actual functional change(s) to code modules that, respectively, are either under development or, generally, are already stored within a code repository and ready for selection and direct roll-out into an operational environment of a specific platform.

Once an understanding of implication is determined, the system of the invention can identify and, as appropriate, select or cause adaptation of code and, eventually, propagate and install a final code module into a new or updated processing environments in one or more platforms.

The AI agents of the invention support self-learning in that they consider how changes in a particular codebase have previously affected other similar functionality with the platform(s). In identifying issues that had previously arisen, the system intelligence takes appropriate mitigation to prevent reoccurrence in the code that is to be generated. The mitigation strategy is then fed back into the graph to enhance its history and predictive capabilities. By technical analogy, mitigation of an accident blackspot on a road could take into account the time of day of the accident, weather, prevailing road conditions, vehicle speed(s) and any state of the road surface to infer the cause and then to mitigate the effects—by producing a similar or modified solution—at a different location by altering, based on deductive multi-hop reasoning, any one or multiple of those contributing factors.

The system and the cascaded structure of the KG, in both an alternative or complementary sense, may otherwise directly (before code module substitution or code adaption) output a listing of platforms (and/or the nature of processable data within such systems that rely or relate operationally to the code module that is to be substituted or adapted) that would be affected by any change of or to an existing code module within the primary platform.

Advantageously, the present invention provides a system in which a multi-dimensional knowledge graph captures (and in use supports detection of) relationships and entities relevant to the specific question at hand. This contrasts to capturing all relationships and entities at random levels of granularity. The approach of the present invention can be set recursively to retrieve and iteratively construct new multi-dimensional knowledge graphs over time as new code is introduced.

The augmented cascaded multi-dimensional knowledge graph of the invention can beneficially automatically conjoin and merge functions and data, based on sub-graphs created each time a separate question is asked, allowing the system to evolve and increase its operational performance with each query. This allows for the creation of relevant knowledge bases by passing a list of questions at an automated knowledge graph tool. Besides simplifying development processes, this knowledge base acts as a memory tool for the LLM and performs multi-hop reasoning across codebases.

The present invention provides for a workflow that allows for the creation of LLM-driven context-aware multi-dimensional knowledge graphs.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

In the exemplary context of transfer agency operation, data migration can be achieved through training of a regression model, i.e., a prediction algorithm, that predicts how data from a source would fit into migrated data processed on a different platform. However, the present invention differs from this approach since it assesses how inter-operability across inter-related (but independent platforms) can be maintained over the course of software code evolution actioned in just one processing platform [amongst many].

More generally, the present invention supports an AI-agent based code writing function which eliminates absolute and sole reliance on a vector store [conventionally configured as a retrieval, augmentation, generation "RAG" knowledge base of fixed code sequences] and, instead, is based on a system which instantiates a similarity search by traversing KGs and developed sub-graphs (defining wider platform impact of a chunk at node of the KG). Self-learnt sub-graphs indicate how changed software functions implemented in one platform ripples across other, and usually multiple other, inter-dependent operating platforms to affect different functions, whilst providing also an indication of the importance of the node in the wider context of multiple operations.

Figure 1:
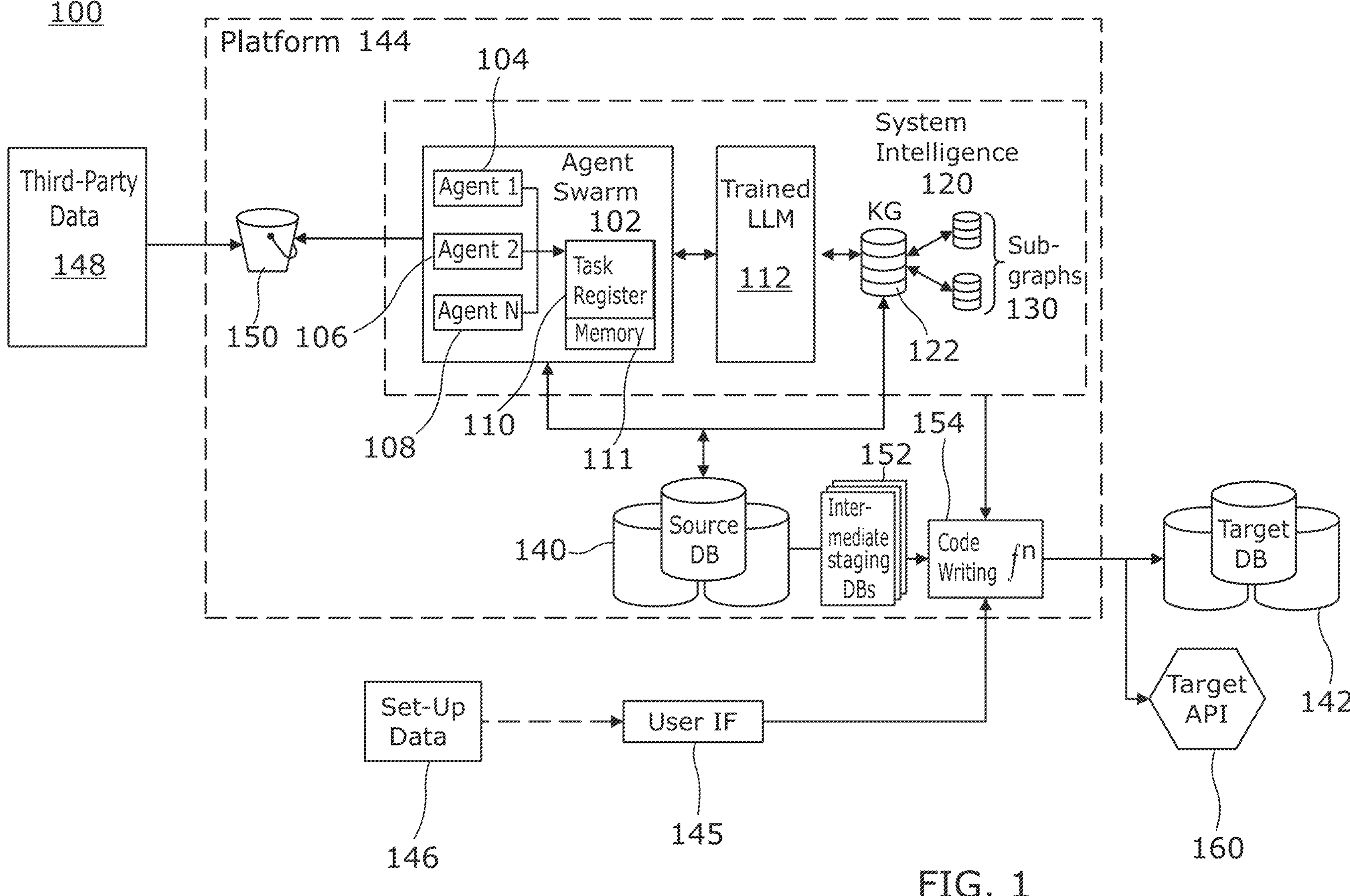
FIG. 1 is an AI-based system embodying the concepts of the present invention.

With reference to FIG. 1, there is a shown an overall AI agent-based system 100 in which functionality and platform interoperability is enhanced. The system makes use of an AI agent swarm assembled from, usually, multiple AI agents 104-108 (of which 1 to N are shown in FIG. 1 and where N>2).

The AI agents are coupled to a task register 110 that records the state of each AI agent with respect to its and others relative and/or actual position with assigned tasks, i.e., the task register, upon access by general or specific system intelligence 120, is configured to provide an indication of an overall state of awareness of progress for an assigned task, thereby ensuring the system intelligence as a whole maintains overall operational control.

Each AI agent is instantiated with (a) a role vector describing its specialist skill (e.g., schema mapping, code generation, test-case synthesis), (b) a goal register that stores the current task drawn from the task register 110, and (c) a capability profile (tools, max-token-budget, allowed-latency) that the system intelligence 120 uses to schedule work. Agents share intermediate results through a broadcast memory 111 and negotiate task ownership with a contract-net protocol, ensuring that no single agent becomes a bottleneck. A task will be broken down and distributed to specific agents which are arranged to collaborate with one another to deliver a completed objective in the task.

A trained LLM 112 interacts with the agents. The trained LLM 112, which is an appropriately trained artificial neural network ANN, is trained in accordance with techniques known in the art and, as such, is cognizant of generic mappings and/or policies relating, for example, to why a decision is or is not appropriate. A suitable LLM is, for example, an instruction-tuned 70 billion parameter transformer trained with migration context on a mixture of SQL code, data mapping-decision records and domain-specific plain language. Fine-tuning can be performed with Low-Ranking Adaption "LoRA" adapters on ~5 million supervised fine tuning (SFT) pairs taken from historical migration projects.

The LLM therefore is configured to support resolution of articulated problems presented for interrogation by the AI agents 104-108 making use, for example, of embeddings. The result, in an ANN, regardless of the training regime remains an approximation to reality since all artificial neural networks are, in the limit, approximation machines.

In the exemplary context of a TA environment, the LLM would be a model supporting a data migration objective, and in a generic sense it is trained to support a decision-making process to accomplish a specified function to deliver a crafted and sought-after result. Applying this approach in migration, the solution of the system creates a model based on a transformer architecture trained on a corpus of regular text to predict the relationship between a source and target data, i.e., mapping field-to-field or values within those fields.

In combination with the wider concept and control brought about and orchestrated by the system intelligence 120, the LLM interacts with a knowledge graph, KG, 122. At its upper level, the KG 122 acts as a store for "chunks" at nodes to allow the fixing and repeated retrieving of information based around a single concept within a codebase.

A chunk may be assembled from a web-accessible tool, with a chunk being any functional capability that is not supported by the LLM. These tools may be derived from a vector store of contextual information in an NLP-related Retrieval-Augmented-Generation (RAG) hybrid model.

Additionally, according to the present invention, multiple sub-graphs 124-126 (of which only two are shown in FIG. 1) encompass weighted relationship data identifying, for example, code-holding entities/locations in a database for different affected code functions commonly sharing a definable relationship used across multiple processing environments (typically supported on different platforms).

Figure 2:
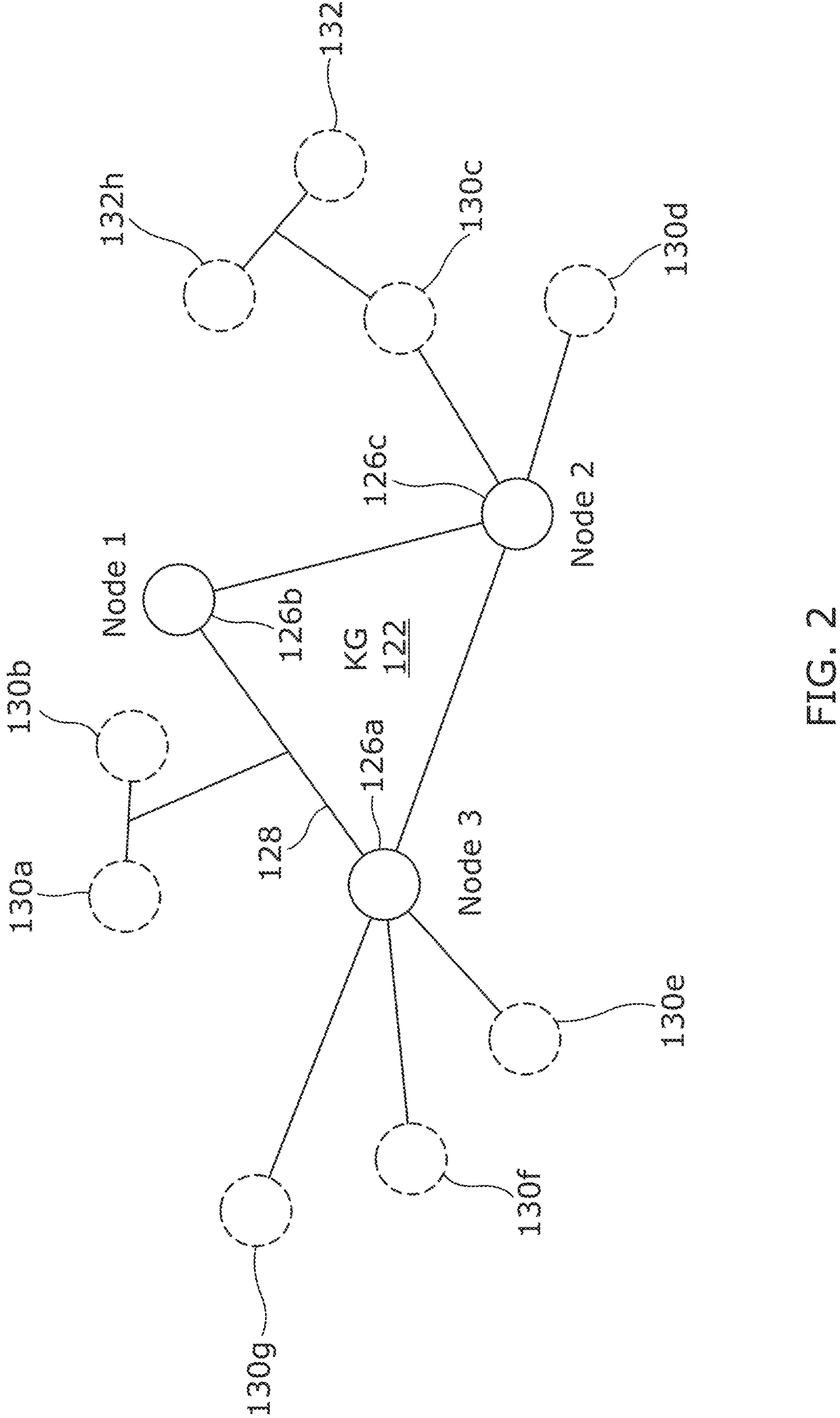
FIG. 2 is a representation of a multidimensional knowledge graph employed within the AI-based system of FIG. 1.

The relationship between the higher-level KG 122 and sub-graphs 124-126 is represented in FIG. 2 in which different core chunks are stored at different nodes 126*a*-126*c*, and zero or one of more sub-graphs 130 (specifically 130*a*-130*i*) depend/cascade from (i) each node or (ii) connecting edges 128 between each node, e.g., between node 1 and node 3 (reference numerals 126*a* and 126*b*, respectively). For explanation reasons only, FIG. 2 shows just three of potentially many tens or hundreds of nodes (and related edges).

In FIG. 2, for example, two sub-graphs 130*c*, 130*d* depend from node 2 (reference numeral 126*c*), whilst a further two subordinate lower-level sub-sub-graphs 132*h*, 132*i* further depend from sub-graph 130*c*. Each dependent layer provides additional characterising data expanding on the impact caused across platforms through an alternation of the higher-level node. As an example, node 3 (reference numeral 126*a*) has three direct sub-graphs 130*e*-130*g*.

In terms of AI-agent interaction with the data chunks, this is directly influenced by the nature and, usually, the number of dependent relationships. Typically, there will be many nodes and many dependent sub-graphs, with FIG. 2 simply illustrating the cascaded or tree-like nature of characterizing contextual parameters.

The importance of a node within a platform is reflected in the weighting that the system intelligence associates in sub-graphs. A higher weighting, w, means the chunk is both highly reused and, as such, it carries a higher risk factor because, from stored history within the sub-graphs, it has impacted indirectly or directly linked functions. Higher risk may generate an alert flagging that a proposed code change requires higher investigation concerning its overall impact on inter-operability and overall multi-platform performance.

Post roll-out by the AI system, the agent swarm polls deployment pipelines (in the codebase) to reconcile expected vs. actual functional performance on real data, flagging drift in the task register and updating the sub-graphs and KG accordingly.

To support the assignment of updateable data into the multi-dimensional knowledge graph an algorithm having a form such as that immediately below can be considered and employed:

$$w(\text{node})=\alpha N\_\text{dep}+\beta\Sigma\text{edge\_crit}+\gamma\text{change\_freq}$$

where:

w(node) for a sub-graph for a specific node;

N_dep is the number of direct dependencies, edge_crit is a criticality score learned from post-mortem incident data reporting efficacy and positive/negative effects of the change at the node or change in the chunk, change_freq captures how often a chunk has been changed, and α, β and γ are integers.

Other weighting mechanisms may be employed, as will be reasonably envisioned.

Since each sub-graph relates to a single conceptual relationship, retrieval and interpretation of the system intelligence—and use by the AI swarm—is thus more scoped and structured to the question which contained the enquiry. This allows for retrieval of data related to a single concept across multiple repositories over time, as well as over different code chunks.

In summary of the sub-graph functionality, it provides a qualified and deep understanding of relationship data that augments the chunks at higher level nodes to provide an impact context. Particularly, the sub-graphs 130 support a real-time understanding of data manipulation and data movement requirements between a source database 140, coupled at an output of the system intelligence 120, and a target database 142 external to the specific operational platform 144. Consequently, the augmented knowledge graph of the invention in general, and particularly its sub-graphs of the preferred embodiments, act as a contextually aware filter, with the AI agents 104-106 and processing intelligence 120 iteratively and constantly adding information to the relevant context.

To populate sub-graphs, the system employs an appropriate chunking mechanism of which there are many known, e.g., objective orientated approaches compared to alternative procedural programming.

A user interface 145, such as provided through an API running on a networked computer, in coupled to the source database to provide for enquiry input to be delivered to the system intelligence and resolved by the agent swarm 102. An enquiry can be delivered through a chat interface that is arranged to provide the user with an ability to gain insights, such as direct textual answers or diagrammatic representations, into or about their codebase. The user input 145 receives a variety of data related to interactions of a user with external influential data.

In the context of migration, the user interface comprises a migration control app, and permits entry of configuration data and migration oversight control data. Original source data may be loaded or pulled or scraped from multiple external data resources 148, such as existing platforms ripe for migration or upgrade, in response, to user instructions entered, for example, via the user interface 145. This may be a direct or an indirect acquisition of data. Original source data may be provided to the platform 144 as a coded, i.e., secure, transfer stream, such as SFTP or the like. The user interface will also allow user to view and amend mappings defined by the AI process. Typically, the acquired third party source data will be temporary assembled in an object store 150 local to or available to the processing intelligence 120. The object store 150 may be cloud storage. In a TA context, source offload data is conveyed by SFTP (or a similar transmission protocol) and, further, can be accompanied by data specification files and any reconciliation scripts.

Once engaged, the system intelligence 120, in totality, is configured to interpret the change requirements in the source data, with the operation preferably producing a model in at least one staging database 152 intermediately located between the source database 140 and a code writing function 154, such as an Extract-Transform-Load "ETL" pipeline. The code writing function 154 applies both to functional code change for rollout across platforms, and also to the specific task of data migration.

Based on a range of triggers, the system intelligence connects to the originating source 148 and pulls all requisite data into the object store 150. The AI agents 104-108 manage the process through writing relevant metadata into the task register memory. Additional direction, such as connection and general configuration settings, can be supplied to the AI agent swarm 102 via suitable API interfaces.

Staging database 152 provides a bed for a generated AI model, with the staging database providing a reliable simulated production environment. From a purely managerial perspective, a curated version of data processing decision and the offload data can also be stored in staging database.

In an application of the entire system embodying both concepts of code development and its deployment and then also data migration, the AI swarm 102 functions to determine mapping and transformations. A mapping agent generates candidate SQL-like transformation snippets with a sequence-to-sequence model, scores each candidate with a learned data-quality [critic] agent, then validates the top-k snippets against sample rows in the staging database 152 using a Python library in a dataframe, e.g., a "Pandas" property test. Accepted mappings are stored, for example, as JSON-L code-chunks or the like and linked back to both source- and target-schema nodes in the KG. Unresolvable queries are flagged and pushed to the user interface for direct consideration, with all resolved processes (automated or manually instructed) and outcomes further stored, such as in complementary by independent intermediate staging databases.

Functionally, data specifications (such as the data specification files provided with the source data giving descriptions of the columns and types) are run through an embedding model, chunked and stored in the custom augmented knowledge graph 122 and sub-graphs 130 of the embodiments of the invention. This allows the AI environment of the system to gain specific knowledge and context about a dataset without retraining or fine-tuning.

When the agents, operating in a data migration role, need to send any data to the model (schema and/or rows in the context of data migration in financial services), any row data which needs to be sampled to resolve appropriate transformations is preferably obfuscated first either by stripping values which are not materially relevant or, secondly, by replacing the real value with a fake but representational value. This way the actual row data is never passed to the AI. At maximum, the AI is exposed to the source and target schema as well as up a predefineable number of rows per table of obfuscated data. In combination, this data aids the system intelligence both to work out required transformations but also data mappings. Once mappings and transformations are determined and then confirmed, the AI agents can assemble code, build, deploy and then run the ETL pipelines to convert source data into a target environment. Confirmation is performed by a governance agent whose only prompt is the enterprise-specific data-quality policy. If the governance agent's confidence $\geq\tau$ (typically 0.95) the mapping is auto-approved; otherwise the issue is routed to a designated human data-steward for sign-off via the user interface 145.

From a practical implementation perspective in the code writing adaptation of chunks, code is pushed and held in GitHub for version control reasons.

The ETL pipeline 154 is responsive to control from the system intelligence and, particularly the AI agent swam 102. The ETL pipeline 154 is configured to write code that reflects the contextual relationships required to maintain interoperability between inter-related operating systems, with code structure and roll-out directly influenced by the sub-graphs [which identify inter-dependencies in different data processing tasks supported across those inter-related operating systems].

As will be understood, EFL involves extracting data from various sources, transforming it into a suitable format, and loading it into the target system. This process ensures that the data is accurate, complete, and up-to-date, making it ready for analysis and reporting. The extraction phase involves retrieving data from different sources, such as transactional systems, spreadsheets, and flat files. This data is then stored in a staging area to ensure it is in a consistent format before transformation. This step avoids corrupting the target system with inconsistent or corrupted data. In the transformation phase, the extracted data is processed to fit the target system's format. This involves several tasks such as filtering, cleaning, joining, splitting, and sorting the data. For example, data cleansing might involve filling in missing values or standardizing different representations of the same data. Advanced transformations can include deriving new values, joining data from multiple sources, and summarizing data to create metrics. The final phase is loading the transformed data into the target system. This can be done either as a full load, where all data is loaded at once, or as an incremental load, where only new or changed data is loaded.

The choice between these methods depends on the specific requirements and the volume of data.

The processing effect of the present invention is an output that effectively maps source information into the target database 142 or a target application program interface "API" 160, whilst the system of the embodiments of the invention maintains a functional coding structure across platforms because developed and deployed code modules retain collective interoperability to reflect the contextual relationships of the sub-graphs 130.

In a specific TA data migration environment, after data is written to the target (such as target database 142), auto reconciliation may be performed in accordance with standard rules, such as row count and totalling. Specific reconciliation scripts can, again, be executed by an AI agent and results stored and reported with the augmented knowledge graph of the present invention.

The platform 144 may be distributed in that functions may be remotely located. However, it is typically within a central server-based AI-centric AI agent environment operated by a software provider such as, the case of an exemplary transfer agency, a service provider managing the change of ownership of company shares, maintaining accurate investor records and facilitating and processing transactions for individual and corporations alike.

Figure 3:
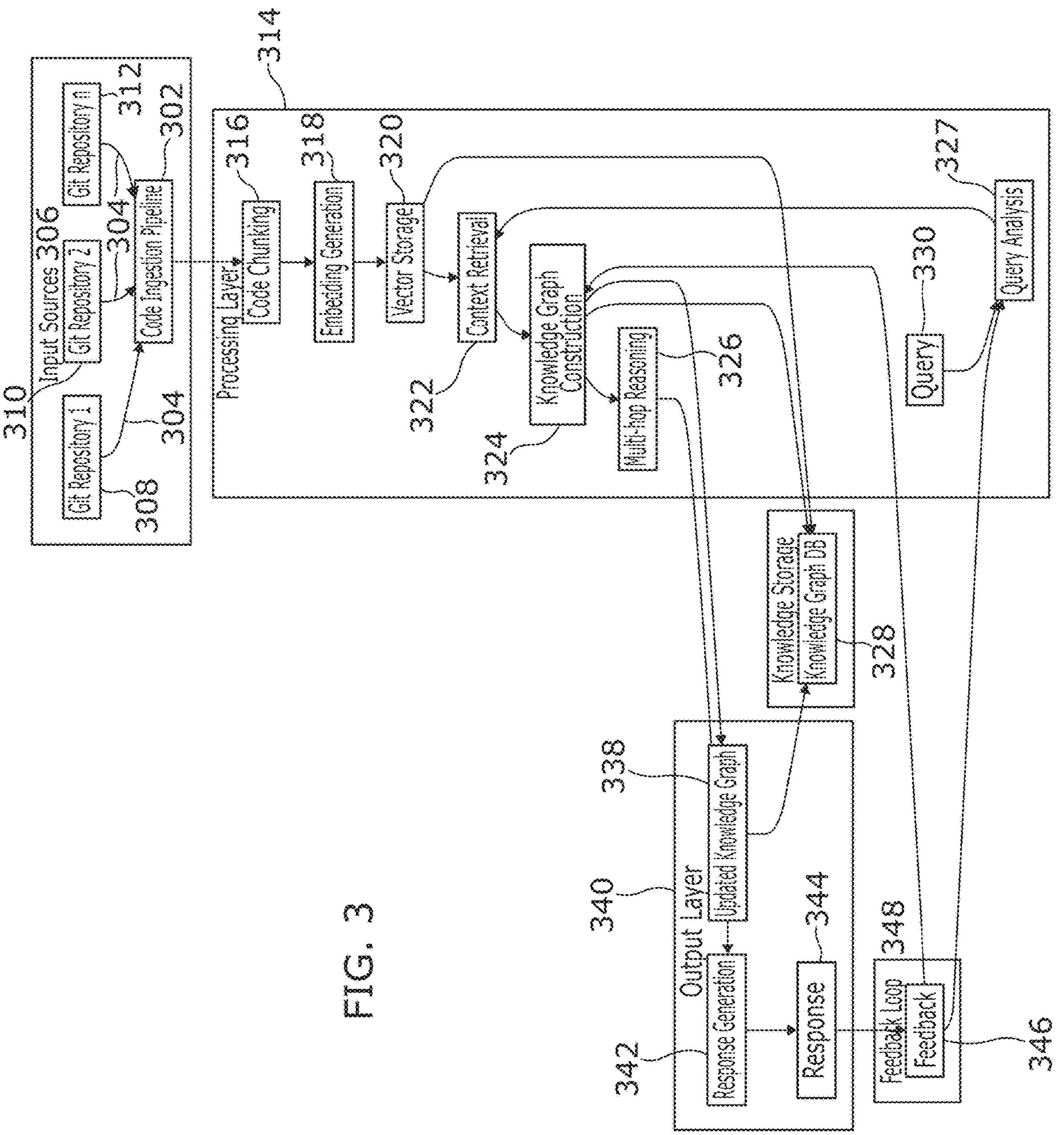
FIG. 3 relates to a process for construction of the multi-dimensional knowledge graph of the preferred embodiments of the invention, and particularly aspects pertaining to multi-hop reasoning applied within and by the AI agents of FIG. 1.

Reference is made to the process of FIG. 3 relating to a process 300 supporting construction and maintenance of the multi-dimensional knowledge graph of the preferred embodiments of the invention, and particularly an aspect pertaining to multi-hop reasoning applied within and by the AI agents of FIG. 1.

A code ingestion pipelines 302 receives data 304 from input sources 306, such as multiple GIT repositories 308-312. Within a processing layer 314, the ingested code is chunked 316 and related embeddings generated 318. The embeddings are stored 320 in a vector store. A context retrieval function 322 is actioned by the AI agents (of FIG. 1), and as will be explained in more detail below. The effect of context retrieval is two-fold: (i) it is necessary for the construction 324 of the multi-dimensional knowledge graph, and (ii) it imbues the system with a cluster of knowledge that allows for interpretation of retained information to support provision of multi-hop reasoning 326 and coherent responses, following query analysis 327, to enquires based on identified experience stored as information, accessible by the system intelligence, in a knowledge storage, i.e., a knowledge graph database 328.

As an example of multi-hop reasoning, a first sub-graph may [in the exemplary context of TA and data migration] may be created for the question or question 330, "What authentication methods does the user service use?" The system of the invention is arranged to store the answer as contextual data for general concepts regarding authentication in the user service. For a conceptually linked question, "How does the payment service handle authentication?", a second sub-graph is created, with the AI-based system configured to detect the potentially overlapping relationships and, consequently, to cause automatic association/syncing to the first sub-graph.

Queries 330 cause AI-agent based query analysis 327 and context retrieval 322.

Extending the exemplary query to authentication, when a subsequent question is asked (via the user interface), "How do the user and payment services authenticate with each other?", instantiation of the search by the system intelligence sees the LLM first check the memory store for relevant relationships and facts. In detecting that the user service and payment service are linked by a conjoined graph relevant for response, the system intelligence retrieves the information relevant to both services and their authentication methods. This demonstrates the multi-hop reasoning performed in a single retrieval action now supported by conjoining and traversing the conceptual relationship that different entities share across different repositories.

Retention of contextual relationship data stored within a sub-graphs is a key primitive enabling LLMs to perform multi-hop reasoning across concepts from various different repositories or files.

Returning to FIG. 3, multi-hop reasoning leads to updating 338 of the multi-dimensional knowledge graph (within the construct of an output layer 340), and then to response generation 342 and response delivery 344 (over an interface or across a network as a message).

Optional user feedback 346 within a feedback loop 348 may be provided to query analysis 327 and eventually into construction 324 of the multi-dimensional knowledge graph.

Figure 4:
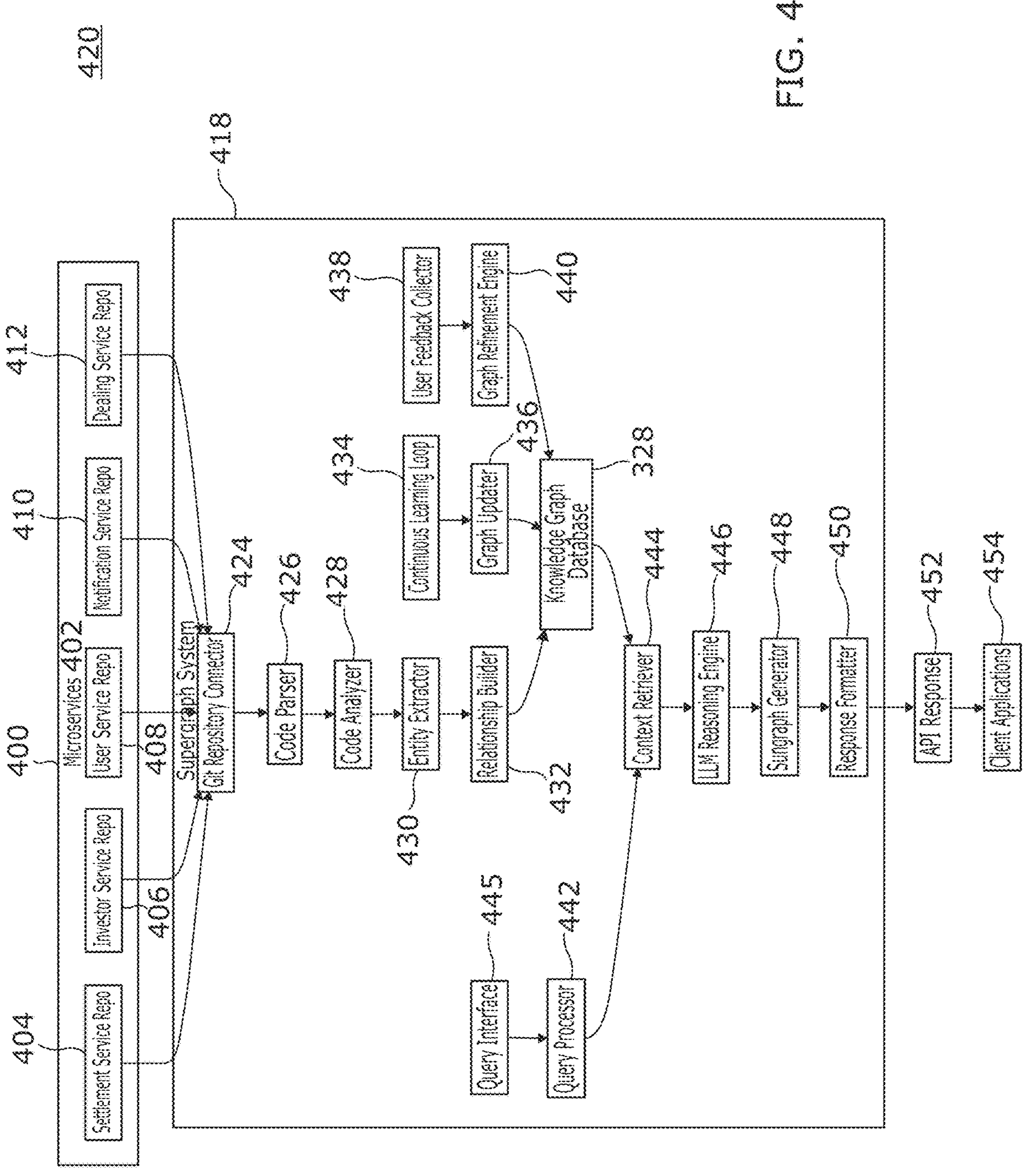
FIG. 4 shows, in schematic form, the functional components of the system of a preferred embodiment of the invention.

FIG. 4 shows, in schematic form, the functional components of the system of a preferred embodiment of the invention.

At a platform level 400, a multiplicity of microservices 402 which, in the context of a TA environment, might include (amongst others) a settlement service repository 404, an investor service repository 406, a user service 408, a notification service 410, and a dealing service 412. There may be other repositories, as will be appreciated, dependent upon specific requirements. Each "service" is essentially a folder that holds the source code.

The functional components within FIG. 4 include:

a) A Git repository connector 424. This is a door-keeper function that plugs into the microservice code folders and functions to bring a fresh copy of the code [in the repository] into the system whenever there is a change in content.

b) A code parser 426 that is arranged to read the raw code line-by-line, turning it into a structured format that the functional components of the system can understand and process.

c) A code analyser 428. The function identifies the function performed by each piece of code (e.g., "this function sends emails").

d) An entity extractor 430 operates to identify and highlight important aspects in the date, e.g., classes, functions, database tables, APIs. This is analogous to highlighting the names of characters in a book.

e) A relationship builder 432, with functions (a) to (d) feeding into the knowledge graph database 328. The relationship builder draws associations between bits (e.g., "Service A calls Service B" or "Function X updates Table Y"), creating a map of how everything fits together.

f) A continuous learning loop 434 and, preferably, a graph updater 436 also feed into the knowledge graph database 328. The continuous learning loop 434 is a background agent that maintains a watch on new code commitments, essentially identifying that has occurred and then acquiring the changes and any metadata. The graph updater 436 physically writes the identified changes into the knowledge graph so that it always reflects the latest code. The knowledge graph database 328 provides a multi-graph view of all the code pieces and how they relate. This is the shared memory which the AI agents consult.

g) A user feedback collector 438 and graph refinement function can also feed into the knowledge graph database 328. The user feedback collector 438 allows developers to correct or comment (e.g., "that description is wrong" or "these two should be linked"), gathering real-world input.

h) A query interface, essentially the user interface 145 of FIG. 1, allows entry of queries, as text or images, into a query processor 442. The query interface may be realised as a simple text box (or API endpoint). For example, the query interface may permit a question of the form "What happens when a trade settles?" to be asked.

i) the query processor 442 and knowledge graph database 328 provide inputs to a context retriever 444, with this in turn interacting with an LLM reasoning engine 446. The query processor 442 translates plain-language question into a form or language upon which the system can act, e.g., "find all code paths that call SettleTrade." The context retriever 444 looks into the knowledge graph and fetches only the pieces relevant to the question, avoiding the need to load the entirety of a codebase. The LLM reasoning engine 446 is a large-language-model agent that reasons over context, understanding the intent of a question to resolve the best answer or edit plan. The LLM reasoning engine thus influences operation of a sub-graph generator 448 which feeds into a response formatter 450 to provide, externally to the intelligent functional components 418. The sub-graph generator 448 is configured to carves out a sub-graph (or mini-map) showing just the entities and links that are considered presently important, and moreover it is configured to continually ask the system to resolve AI generated questions to allow creation of new sub-graphs to support multi-hop reasoning. The response formatter 450 converts results into a AI usable format.

j) An API response 452 into client applications 454. The API response is simply the packaged answer that is sent back across the network, and the client applications 454 amount to end points that consume generated answers from the system.

From a detailed implementation perspective of an embodiment of the invention, the system provides:

1. Trigger to Question Embedding

Every design-change request or natural-language question is embedded as a 768-d vector, q.

A relevance-attention kernel scores each node $n_i$ in the global knowledge-graph KG with $r_i$=softmax $(q \cdot e_i/\sqrt{d})$, where $e_i$ is the node-embedding produced by the graph-SAGE encoder.

Nodes with $r_i \geq \tau$ (default 0.20) are copied into a query sub-graph $G_{(q)}$; this typically contains ≤2% of KG, keeping context tight but sufficient.

2. Explicit Cross-Platform Edges Inside the Sub-Graph

Every code-chunk node carries the attribute platform={java-svc-A, python-svc-B, . . . }.

When the crawler finds an inter-service call (REST, gRPC, message bus) it writes an edge ($chunk_1 \rightarrow chunk_2$, label="cross-platform-call").

Those edges are preserved in $G_{(q)}$, so the sub-graph always includes all platforms that could be impacted, not just the requester's repo.

3. Agent Planning Constrained to the Sub-Graph.

An agent pulling task T from the task-register receives (a) a copy of $G_{(q)}$ and (b) a goal signature describing the user-intent.

Its path-planner must choose sequences of nodes exclusively in $G_{(q)}$; the runtime will reject an action that references an out-of-scope node, preventing drift.

4. Platform-Aware Code Synthesis

Each code-chunk node stores a template family ID (e.g., spring-controller, django-serializer).

During generation, the agent calls synthesise (template_id, platform_spec) so that the emitter fills in language-specific scaffolding (imports, build annotations, CI job).

Shared logic—business rules, SQL, protocol buffers—is materialised once and referenced in every per-platform wrapper, guaranteeing functional parity.

5. Cross-Platform Invariants are Auto-Checked

The orchestration module compiles an invariant set Σ from edges labelled cross-platform-call. Example: "method/submitOrder must accept JSON schema v3 on every platform".

After code generation the test-agent runs Σ; violations reopen the task and bump the offending node's risk weight so future planners treat it as high-impact.

6. Deployment Reconciliation Loop

When CI/CD pushes a build tagged with sub-graph ID=uuid($G_{(q)}$), every platform's control plane logs the tag.

A reconciler agent polls those logs; only when all platforms report the tag does the system mark T as "closed", ensuring no platform lags behind.

7. Incremental Learning from Drift

If a hot-fix later alters one platform independently, the crawler detects drift, re-scores the affected edge weights and schedules a follow-up mapping task so that other platforms are realigned—closing the feedback loop.

The system of the present invention has developed an intelligent, AI-driven tool that streamlines the software rollout for interoperability. The system leverages advanced analytics, automation, and real-time monitoring capabilities to reduce significantly timescales, effort, and errors. An important feature is that knowledge is retained to provide both auditability and a basis for future platform evolution or migration. Interactions of the system intelligence and particularly the AI agents in the swarm with the multi-dimensional knowledge graph identify precisely the code changes required for interoperability and, significant, independently from the front end LLM.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented, unless a specific order is expressly described or is logically required.

Moreover, various aspects or features described herein can be implemented as a method, apparatus, or article of manufacture using standard programming and/or engineering techniques. The term "article of manufacture" as used herein is intended to encompass a computer program accessible from any computer-readable device or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other computer-readable media for storing information. The term "computer-readable medium" may include, without being limited to, optical, magnetic, electronic, electro-magnetic and various other tangible media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application while remaining, either literally or equivalently, within the scope of the accompanying claims.

The above description has therefore been given by way of example only and that modification may be made within the scope of the present invention, as particularly set out in the claims.

What is claimed is:

1. A software development system including:

a plurality of trained AI-agents each having assigned functional tasks, said AI agents together forming an agent swarm;

a task manager configured to oversee interactions within the agent swarm;

a knowledge graph database responsive to the AI agents, the knowledge graph database containing an updateable multi-dimensional knowledge graph in which each node contains a data chunk and wherein each node and at least some edges between nodes are classified by at least one dependent cascaded sub-graph having an assigned attribute for a weighted significance of the data chunk, determined by the agent swarm, with respect to an identified operational impact of the data chunk in a plurality of code modules executed within at least one operational processing platform, wherein each assigned attribute is:

generated by the agent swarm by having AI agents interact to apply multi-hop reasoning that reflects a determination of how a first data chunk instantiated in a codebase has previously affected functionality associated with use of the first data chunk; and updateable, as determined by the agent swarm, with time; and processing intelligence, responsive to the multi-dimensional knowledge graph and associated with the agent swarm, wherein the processing intelligence is configured to manage a code writing function configured to take into account, in the generation of code, the assigned attributes for nodes or edges stored within cascaded sub-graphs of the multi-dimensional knowledge graph, wherein the processing intelligence is arranged to, one of:

(i) mitigate one or more effects of instantiated or generated code, making direct use of data chunks or based on evolution of the data chunks, determined by the agent swarm and historically recorded by the processing intelligence to have caused adversely compromised processing of data or data integrity within an operational processing platform accessible to the processing intelligence; and (ii) prevent generation of code making direct use of data chunks determined by the agent swarm historically recorded by the processing intelligence to have caused functional disruption within an operational processing platform accessible to the processing intelligence.

2. The software development system of claim 1, wherein the code writing function is independent of any front-end large language model "LLM," and wherein the processing intelligence is arranged automatically to propagate generated code, to inter-operationally related operating platforms, that preserves inter-operability of functions instantiated in those inter-related operating platforms.

3. The software development system of claim 2, wherein the agent swarm, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform.

4. The software development system of claim 1, wherein the agent swarm, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform.

5. The software development system of claim 1, wherein the processing intelligence is arranged to feed back any mitigation strategy into the agent swarm to cause update of the multi-dimensional knowledge graph, thereby to enhance its history and support predictive capabilities of the AI agents.

6. The software development system of claim 1, wherein the attributes are contextual relationships.

7. The software development system of claim 1, wherein the system uses object-orientated codebases to support self-learning within the multi-dimensional knowledge graph, and the system further includes:

a user interface arranged to input a query and to receive a response thereto.

8. The software development system of claim 7, wherein the response is sent as a message over a network.

9. The software development system according to claim 1, wherein the processing intelligence is a distributed intelligence.

10. The software development system according to claim 1, wherein the processing intelligence is configured to break down and distribute one or more tasks to the AI agents.

11. A software development system including:

a plurality of trained AI-agents each having assigned functional tasks, said AI agents together forming an agent swarm;

a task manager configured to oversee interactions within the agent swarm;

a knowledge graph database responsive to the AI agents, the knowledge graph database containing an updateable multi-dimensional knowledge graph in which each node contains a data chunk and wherein each node and at least some edges between nodes are classified by at least one dependent cascaded sub-graph having an assigned attribute for a weighted significance of the data chunk, determined by the agent swarm, with respect to an identified operational impact of the data chunk in a plurality of code modules executed within at least one operational processing platform, wherein each assigned attribute is:

generated by the agent swarm by having AI agents interact to apply multi-hop reasoning that reflects a determination of how a first data chunk instantiated in a codebase has previously affected functionality associated with use of the first data chunk; and updateable, as determined by the agent swarm, with time; and processing intelligence, responsive to the multi-dimensional knowledge graph and associated with the agent swarm, wherein the processing intelligence is configured to manage a code writing function configured to take into account, in the generation of code, the assigned attributes for nodes or edges stored within cascaded sub-graphs of the multi-dimensional knowledge graph, wherein a weight, w, is determined by the agent swarm and assigned, by the agent swarm, to an attribute in a sub-graph for each node according to a function $$w(\text{node})=\alpha N\_dep+\beta\Sigma edge\_crit+\gamma change\_freq$$

where:

w(node) for a sub-graph for a specific node;

N_dep is the number of direct dependencies;

edge_crit is a criticality score learned from post-mortem incident data reporting efficacy and positive/negative effects of a change at the node or change in the chunk;

change_freq captures how often a chunk has been changed; and

α, β and β are integers.

12. A software development system including:

a plurality of trained AI-agents each having assigned functional tasks, said AI agents together forming an agent swarm;

a task manager configured to oversee interactions within the agent swarm;

a knowledge graph database responsive to the AI agents, the knowledge graph database containing an updateable multi-dimensional knowledge graph in which each node contains a data chunk and wherein each node and at least some edges between nodes are classified by at least one dependent cascaded sub-graph having an assigned attribute for a weighted significance of the data chunk, determined by the agent swarm, with respect to an identified operational impact of the data chunk in a plurality of code modules executed within at least one operational processing platform, wherein each assigned attribute is:

generated by the agent swarm by having AI agents interact to apply multi-hop reasoning that reflects a determination of how a first data chunk instantiated in a codebase has previously affected functionality associated with use of the first data chunk; and updateable, as determined by the agent swarm, with time; and processing intelligence, responsive to the multi-dimensional knowledge graph and associated with the agent swarm, wherein the processing intelligence is configured to manage a code writing function configured to take into account, in the generation of code, the assigned attributes for nodes or edges stored within cascaded sub-graphs of the multi-dimensional knowledge graph;

wherein the code writing function is independent of any front-end large language model "LLM,"

wherein the processing intelligence is arranged automatically to propagate generated code, to inter-operationally related operating platforms, that preserves interoperability of functions instantiated in those inter-related operating platforms, wherein the agent swarm, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform, and wherein a weight, w, is determined by the agent swarm and assigned, by the agent swarm, to an attribute in a sub-graph for each node according to a function $$w(\text{node})=\alpha N\_dep+\beta\Sigma edge\_crit+\gamma change\_freq$$

where:

w(node) for a sub-graph for a specific node;

N_dep is the number of direct dependencies;

edge_crit is a criticality score learned from post-mortem incident data reporting efficacy and positive/negative effects of a change at the node or change in the chunk;

change_freq captures how often a chunk has been changed; and

α, β and γ are integers.

13. A software development system including:

a plurality of trained AI-agents each having assigned functional tasks, said AI agents together forming an agent swarm;

a task manager configured to oversee interactions within the agent swarm;

a knowledge graph database responsive to the AI agents, the knowledge graph database containing an updateable multi-dimensional knowledge graph in which each node contains a data chunk and wherein each node and at least some edges between nodes are classified by at least one dependent cascaded sub-graph having an assigned attribute for a weighted significance of the data chunk, determined by the agent swarm, with respect to an identified operational impact of the data chunk in a plurality of code modules executed within at least one operational processing platform, wherein each assigned attribute is:

generated by the agent swarm by having AI agents interact to apply multi-hop reasoning that reflects a determination of how a first data chunk instantiated in a codebase has previously affected functionality associated with use of the first data chunk; and updateable, as determined by the agent swarm, with time; and processing intelligence, responsive to the multi-dimensional knowledge graph and associated with the agent swarm, wherein the processing intelligence is configured to manage a code writing function configured to take into account, in the generation of code, the assigned attributes for nodes or edges stored within cascaded sub-graphs of the multi-dimensional knowledge graph;

wherein the code writing function is independent of any front-end large language model "LLM,"

wherein the processing intelligence is arranged automatically to propagate generated code, to inter-operationally related operating platforms, that preserves inter-operability of functions instantiated in those inter-related operating platforms, wherein the agent swarm, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform, and wherein the processing intelligence is arranged to, one of:

(i) mitigate one or more effects of instantiated or generated code, making direct use of data chunks or based on evolution of the data chunks, determined by the agent swarm (102) and historically recorded by the processing intelligence to have caused adversely compromised processing of data or data integrity within an operational processing platform accessible to the processing intelligence; and (ii) prevent generation of code making direct use of data chunks determined by the agent swarm (102) historically recorded by the processing intelligence to have caused functional disruption within an operational processing platform accessible to the processing intelligence.

14. A data migration system comprising:

the software development system of claim 1, a user interface arranged to allow oversight of the software development system; and wherein the system is arranged to create a model based on a transformer architecture trained on a corpus of regular text to predict a relationship between source and target data on at least one of a field-to-field mapping and value mapping within fields.

15. The data migration system of claim 14, wherein the code writing function of the software development system is independent of any front-end large language model "LLM," and wherein the processing intelligence is arranged automatically to propagate generated code, to inter-operationally related operating platforms, that preserves inter-operability of functions instantiated in those inter-related operating platforms.

16. The data migration system of claim 14, wherein the agent swarm of the software development system, in applying multi-hop reasoning, is configured to determine how data chunks, instantiated in a codebase, have previously affected similar functional tasks, instantiated in a plurality of operational processing platforms, to that of the first data chunk associated with use of the first data chunk in at least one operational processing platform.

17. The data migration system of claim 14, wherein a weight, w, is determined by the agent swarm of the software development system and assigned, by the agent swarm, to an attribute in a sub-graph for each node according to a function $$w(\text{node})=\alpha N\_dep+\beta\Sigma edge\_crit+\gamma change\_freq$$

where:

w(node) for a sub-graph for a specific node;

N_dep is the number of direct dependencies;

edge_crit is a criticality score learned from post-mortem incident data reporting efficacy and positive/negative effects of a change at the node or change in the chunk;

change_freq captures how often a chunk has been changed; and

α, β and γ are integers.

18. A method of developing software code for operation in an operational software platform, the method comprising:

instantiating a similarity search by traversing a multi-dimensional knowledge graph containing cascaded dependent sub-graphs in which each node at a highest level of the multi-dimensional knowledge graph contains a data chunk and wherein at least each node is classified by at least one cascaded sub-graph depending from the node and present within a lower contextual level of the multi-dimensional knowledge graph; and assigning, to sub-graphs, attributes for contextually weighted significance of a respective data chunk, determined by interacting AI agents arranged in an agent swarm and wherein each AI agent each has an assigned functional task, with respect to an identified operational impact of the respective data chunk in a code module executed within an operational software platform, the method further comprising at least one of:

mitigating, in response to assessment by system intelligence of historically monitored effects related to use of a first data chunk in a code module, adverse functional effects arising from use in code generated using the first data chunk, wherein mitigating is one of:

i) suppression of the use of the first data chunk in altered coding; and ii) generation and communication of a warning of how the data chunk could affect functionality of at least one code module in at least one inter-related operating platform.

19. The method of claim 18, further comprising:

using a task manager to oversee and manage process interactions between AI agents in the agent swarm; and applying multi-hop reasoning within the AI swarm to determine how data chunks, instantiated in a codebase, have previously affected functionality in at least one software platform.

20. The method of claim 19, further comprising:

updating the sub-graphs to reflect predicted or actual changes in operational functionality, determined by the agent swarm, in response to modification of a first data chunk of a node and instantiation of the first chunk in a plurality of code modules in a plurality of inter-related platforms.

21. The method of claim 20, wherein the agent swarm, in applying multi-hop reasoning, determines how data chunks have previously affected similar functional tasks, instantiated in a plurality of operational software platforms.

22. The method of claim 18, further comprising:

updating the sub-graphs to reflect predicted or actual changes in operational functionality, determined by the agent swarm, in response to modification of a first data chunk of a node and instantiation of the first chunk in a plurality of code modules in a plurality of inter-related platforms.

23. The method of claim 18, further comprising:

executing a code writing function, using the agent swarm, that takes into account, in the generation of code, the assigned attributes associated with nodes or edges stored within cascaded sub-graphs of the multi-dimensional knowledge graph.

24. The method of claim 23, wherein the code writing function is independent of any front-end large language model "LLM".

25. The method of claim 23, wherein generated code preserves inter-operability of functions to be instantiated into inter-related operating software platforms.

26. The method of claim 18, wherein the agent swarm, in applying multi-hop reasoning, determines how data chunks have previously affected similar functional tasks, instantiated in a plurality of operational software platforms.

27. The method of claim 18, further comprising:

feeding back any mitigation strategy into the agent swarm to update the multi-dimensional knowledge graph, thereby enhancing its history and supporting predictive capabilities of the AI agents.

28. A method of developing software code for operation in an operational software platform, the method comprising:

instantiating a similarity search by traversing a multi-dimensional knowledge graph containing cascaded dependent sub-graphs in which each node at a highest level of the multi-dimensional knowledge graph contains a data chunk and wherein at least each node is classified by at least one cascaded sub-graph depending from the node and present within a lower contextual level of the multi-dimensional knowledge graph; and assigning, to sub-graphs, attributes for contextually weighted significance of a respective data chunk, determined by interacting AI agents arranged in an agent swarm and wherein each AI agent each has an assigned functional task, with respect to an identified operational impact of the respective data chunk in a code module executed within an operational software platform, wherein the agent swarm determines a weight, w, to be assigned a sub-graph for each node, and the weight is determined according to a function $$w(\text{node})=\alpha N\_\text{dep}+\beta\Sigma\text{edge\_crit}+\gamma\text{change\_freq}$$

where:

w(node) for a sub-graph for a specific node;

N_dep is the number of direct dependencies;

edge_crit is a criticality score learned from post-mortem incident data reporting efficacy and positive/negative effects of a change at the node or change in the chunk;

change_freq captures how often a chunk has been changed; and

α, β and γ are integers.

29. A method of developing software code for operation in an operational software platform, the method comprising:

instantiating a similarity search by traversing a multi-dimensional knowledge graph containing cascaded dependent sub-graphs in which each node at a highest level of the multi-dimensional knowledge graph contains a data chunk and wherein at least each node is classified by at least one cascaded sub-graph depending from the node and present within a lower contextual level of the multi-dimensional knowledge graph; and assigning, to sub-graphs, attributes for contextually weighted significance of a respective data chunk, determined by interacting AI agents arranged in an agent swarm and wherein each AI agent each has an assigned functional task, with respect to an identified operational impact of the respective data chunk in a code module executed within an operational software platform, the method further comprising updating the sub-graphs to reflect predicted or actual changes in operational functionality, determined by the agent swarm, in response to modification of a first data chunk of a node and instantiation of the first chunk in a plurality of code modules in a plurality of inter-related platforms, and the method further comprising at least one of:

mitigating, in response to assessment by system intelligence of historically monitored effects related to use of a first data chunk in a code module, adverse functional effects arising from use in code generated using the first data chunk, wherein mitigating is one of:

i) suppression of the use of the first data chunk in altered coding; and ii) generation and communication of a warning of how the data chunk could affect functionality of at least one code module in at least one inter-related operating platform.

30. A method of developing software code for operation in an operational software platform, the method comprising:

instantiating a similarity search by traversing a multi-dimensional knowledge graph containing cascaded dependent sub-graphs in which each node at a highest level of the multi-dimensional knowledge graph contains a data chunk and wherein at least each node is classified by at least one cascaded sub-graph depending from the node and present within a lower contextual level of the multi-dimensional knowledge graph; and assigning, to sub-graphs, attributes for contextually weighted significance of a respective data chunk, determined by interacting AI agents arranged in an agent swarm and wherein each AI agent each has an assigned functional task, with respect to an identified operational impact of the respective data chunk in a code module executed within an operational software platform, the method further comprising:

using a task manager to oversee and manage process interactions between AI agents in the agent swarm;

applying multi-hop reasoning within the AI swarm to determine how data chunks, instantiated in a codebase, have previously affected functionality in at least one software platform; and updating the sub-graphs to reflect predicted or actual changes in operational functionality, determined by the agent swarm, in response to modification of a first data chunk of a node and instantiation of the first chunk in a plurality of code modules in a plurality of interrelated platforms, wherein the agent swarm, in applying multi-hop reasoning, determines how data chunks have previously affected similar functional tasks, instantiated in a plurality of operational software platforms, and wherein the agent swarm determines a weight, w, to be assigned a sub-graph for each node, and the weight is determined according to a function $$w(\text{node})=\alpha N\_\text{dep}+\beta\Sigma \text{edge\_crit}+\gamma \text{change\_freq}$$

where:

w(node) for a sub-graph for a specific node;

N_dep is the number of direct dependencies;

edge_crit is a criticality score learned from post-mortem incident data reporting efficacy and positive/negative effects of the change at the node or change in the chunk;

change_freq captures how often a chunk has been changed; and $\alpha$, $\beta$ and $\gamma$ are integers.

* * * * *